United States Patent
Iacona

(10) Patent No.: US 10,323,434 B2
(45) Date of Patent: Jun. 18, 2019

(54) INFLATABLE CAB FOR WALK-BEHIND DEVICE

(71) Applicant: Ignazio Iacona, Kings Park, NY (US)

(72) Inventor: Ignazio Iacona, Kings Park, NY (US)

(*) Notice: Subject to any disclaimer, the term of this patent is extended or adjusted under 35 U.S.C. 154(b) by 0 days.

(21) Appl. No.: 15/512,638

(22) PCT Filed: Sep. 23, 2015

(86) PCT No.: PCT/US2015/051648
§ 371 (c)(1),
(2) Date: Mar. 20, 2017

(87) PCT Pub. No.: WO2016/049137
PCT Pub. Date: Mar. 31, 2016

(65) Prior Publication Data
US 2017/0247903 A1    Aug. 31, 2017

Related U.S. Application Data

(60) Provisional application No. 62/053,908, filed on Sep. 23, 2014.

(51) Int. Cl.
*E04H 15/20* (2006.01)
*E04H 15/06* (2006.01)
(Continued)

(52) U.S. Cl.
CPC .............. *E04H 15/20* (2013.01); *E04H 15/06* (2013.01); *A01B 33/028* (2013.01); *A01D 67/02* (2013.01);
(Continued)

(58) Field of Classification Search
CPC ......... E04H 15/02; E04H 15/06; E04H 15/20; E04H 2015/201; E04H 2015/206;
(Continued)

(56) References Cited

U.S. PATENT DOCUMENTS 2,667,379 A    1/1954   Baze
3,333,888 A    8/1967   Williams et al.
(Continued)

FOREIGN PATENT DOCUMENTS

DE    1143401 B    *    2/1963    ......... B62D 33/0621
EP    2484849           8/2012

OTHER PUBLICATIONS

English translation of DE1143401B from espacenet.com.*
(Continued)

*Primary Examiner* — David R Dunn
*Assistant Examiner* — Danielle Jackson
(74) *Attorney, Agent, or Firm* — Gerald E. Hespos; Michael J. Porco; Matthew T. Hespos

(57) ABSTRACT

A protective enclosure or cab for an operator of a walk-behind or mechanical device, such as a snow blower, engine-driven snow thrower, ride-on tractor, or the like, is provided. The protective enclosure or cab includes an inflatable frame structure which supports a plurality of transparent, flexible windows or a single sheet of transparent material such as a curtain. When inflated, the protective cab is detachably coupled to the walk-behind or mechanical device and surrounds an operator of the walk-behind or mechanical device protecting the operator from the environment such wind, rain, snow or the like, while providing an unobstructed view of the surrounding environment. When deflated, the protective enclosure or cab can be folded into a small volume to be placed in a storage device which can be coupled to the walk-behind or mechanical device.

22 Claims, 16 Drawing Sheets

(51) Int. Cl.
*E01H 5/04* (2006.01)
*A01D 75/20* (2006.01)
*B62D 33/06* (2006.01)
*B62D 51/04* (2006.01)
*A01B 33/02* (2006.01)
*A01D 67/02* (2006.01)
*B62B 5/00* (2006.01)

(52) U.S. Cl.
CPC .......... *A01D 75/20* (2013.01); *B62B 5/0013* (2013.01); *B62D 33/0621* (2013.01); *B62D 51/04* (2013.01); *E01H 5/04* (2013.01); *E01H 5/045* (2013.01); *E04H 2015/201* (2013.01); *E04H 2015/206* (2013.01)

(58) Field of Classification Search
CPC .......... E04H 2015/207; B62D 33/0621; A01D 67/02; A01D 75/20; A01D 75/206; A01B 33/028
See application file for complete search history.

(56) References Cited

U.S. PATENT DOCUMENTS

| | | | |
|---|---|---|---|
| 3,598,215 A | 8/1971 | Summer et al. | |
| 3,709,553 A | 1/1973 | Churchill et al. | |
| 3,899,853 A | 8/1975 | Wertman | |
| 4,068,418 A | 1/1978 | Masse | |
| 4,197,681 A * | 4/1980 | Holcombe | E04C 3/005 135/119 |
| 4,295,302 A | 10/1981 | Liu | |
| 4,433,868 A | 2/1984 | Hochwitz et al. | |
| 5,570,544 A * | 11/1996 | Hale | E04H 15/20 52/2.11 |
| 5,692,795 A * | 12/1997 | Mininger | E04H 15/20 135/88.13 |
| 5,720,312 A * | 2/1998 | Scheuermann | E04H 15/48 135/127 |
| 5,890,507 A * | 4/1999 | Hinsperger | A45B 11/00 135/137 |
| 6,178,911 B1 | 1/2001 | Hemphill et al. | |
| 6,279,986 B1 * | 8/2001 | Hinsperger | B62D 33/0625 296/102 |
| 6,318,390 B1 * | 11/2001 | Innis | A45B 19/02 135/20.2 |
| 6,530,617 B2 * | 3/2003 | McElwee | B62D 33/0621 280/770 |
| 6,802,327 B2 * | 10/2004 | Koss | E04H 15/06 135/137 |
| 7,322,309 B2 | 1/2008 | Larochelle et al. | |
| 7,493,711 B2 * | 2/2009 | Gautreau | E01H 5/098 280/32.7 |
| 7,854,463 B1 * | 12/2010 | Neumann | B60J 7/10 296/144 |
| 8,615,966 B2 * | 12/2013 | Thompson | A63H 33/008 446/221 |
| 2009/0025302 A1 | 1/2009 | Wang | |
| 2009/0249700 A1 * | 10/2009 | Peterson | A45F 3/08 52/2.17 |
| 2010/0218794 A1 | 9/2010 | Feinberg et al. | |
| 2011/0187152 A1 * | 8/2011 | Lin | B62D 33/06 296/181.1 |
| 2011/0253184 A1 * | 10/2011 | Mills | E04H 15/20 135/96 |
| 2012/0090248 A1 | 4/2012 | Thompson | |
| 2017/0254109 A1 * | 9/2017 | Colbo | E04H 15/20 |

OTHER PUBLICATIONS

International Search Report and Written Opinion for PCT Application No. PCT/US15/51648; dated Dec. 30, 2015; fourteen (14) pages.

* cited by examiner

INFLATABLE CAB FOR WALK-BEHIND DEVICE

This application claims priority on U.S. Provisional Patent Appl. No. 62/053,908, filed Sep. 23, 2014, entitled "INFLATABLE CAB FOR WALK-BEHIND DEVICE", the contents of which are hereby incorporated by reference in its entirety.

BACKGROUND

Field

The present disclosure relates to a protective inflatable cab for an operator of a walk-behind or mechanical device, such as a snow-blower, ride-on tractor, lawn mower, or the like.

Description of the Related Art

Heretofore others have suggested cabs for walk-behind tractors and the like. One such cab is shown in U.S. Pat. No. 3,333,888, wherein a partial enclosure for the operator of a walk-behind tractor includes transparent windows in a fabric cover draped over a skeleton frame releasably secured to the handlebars and the handlebar supports extending rearwardly from the walk-behind tractor. In U.S. Pat. No. 3,709,553 flexible transparent plastic curtains encompass the passenger compartment of a motorized golf cart. A transparent plastic tractor cab is shown in U.S. Pat. No. 2,667,379.

However, the prior art cabs are cumbersome and difficult to assemble. Therefore, a need exists for an apparatus to protect an operator of a walk-behind mechanical and/or power-driven device which can be easily and quickly assembled.

SUMMARY

The present disclosure provides a protective enclosure or cab for an operator of a walk-behind or mechanical device, such as a snow blower, engine-driven snow thrower, ride-on tractor, or the like. The protective enclosure or cab includes an inflatable frame structure which supports a plurality of transparent, flexible windows or similar sheet material, e.g., a curtain. When inflated, the protective cab is detachably coupled to the walk-behind device and surrounds an operator of the walk-behind device protecting the operator from environmental elements such wind, rain, snow or the like while providing an unobstructed view of the surrounding environment. When deflated, the protective cab can be folded into a small volume to be placed in a storage device which can be coupled to the walk-behind or mechanical device.

The protective enclosure, or cab, is deflatable and stored in a storage device, for example, a box or pouch, attached underneath handles of the walk-behind or mechanical device, e.g., a snow blower, tractor, lawn mower etc. When needed, the cab may be withdrawn from the storage device to be inflated, while the storage device remains coupled to the walk-behind or mechanical device. The cab may be inflated by various means, e.g., with a foot pump placed on the ground, automatic inflation system, etc., to create a frame with clear windows. Once inflated, the foot pump, automatic inflation system, etc., is placed back inside the storage device so the operator may operate the walk-behind or mechanical device unobstructed.

When assembled, the protective enclosure can be entered and exited through a gap or opening in a rear portion of the cab. While holding the handles of the walk-behind or mechanical device, the operator may insert their arms into two cuffs or armrests disposed on each side of an internal surface of the frame structure relative to the operator, to further increase the stability of the cab. Once an operator's arms are inserted into the cuffs, the left and right side of the cab is stabilized and the operator may operate the walk-behind device while being protected from the outside environment.

According to one aspect of the present disclosure, a protective apparatus is provided including an inflatable frame structure defining an interior volume; a plurality of flexible, transparent windows supported by the inflatable frame structure; and a coupling device that couples the inflatable frame structure to a mechanical device.

In another aspect, the plurality of flexible, transparent windows is a single sheet of material disposed over the inflatable frame structure.

According to a further aspect of the present disclosure, an apparatus includes an inflatable frame structure defining an interior volume, the inflatable frame structure includes a plurality of inflatable tubes coupled to each other; a plurality of flexible, transparent windows supported by the inflatable frame structure; a storage device configured to house the inflatable frame structure, the storage device coupled to the inflatable structure and; a coupling device that couples the storage device to a mechanical device.

According to another aspect of the present disclosure, a protective enclosure includes an inflatable frame structure defining an interior volume, the inflatable frame structure includes a plurality of inflatable tubes coupled to each other; a sleeve arrangement configured to cover each tube of the plurality of inflatable tubes; a flexible, transparent curtain supported by and surrounding the inflatable frame structure, an interior surface of the curtain including at least one fastening member for fastening the curtain to the sleeve arrangement; and a coupling device that couples the inflatable frame structure to a mechanical device.

BRIEF DESCRIPTION OF THE DRAWINGS

The above and other aspects, features, and advantages of the present disclosure will become more apparent in light of the following detailed description when taken in conjunction with the accompanying drawings in which.

Figure 1A:
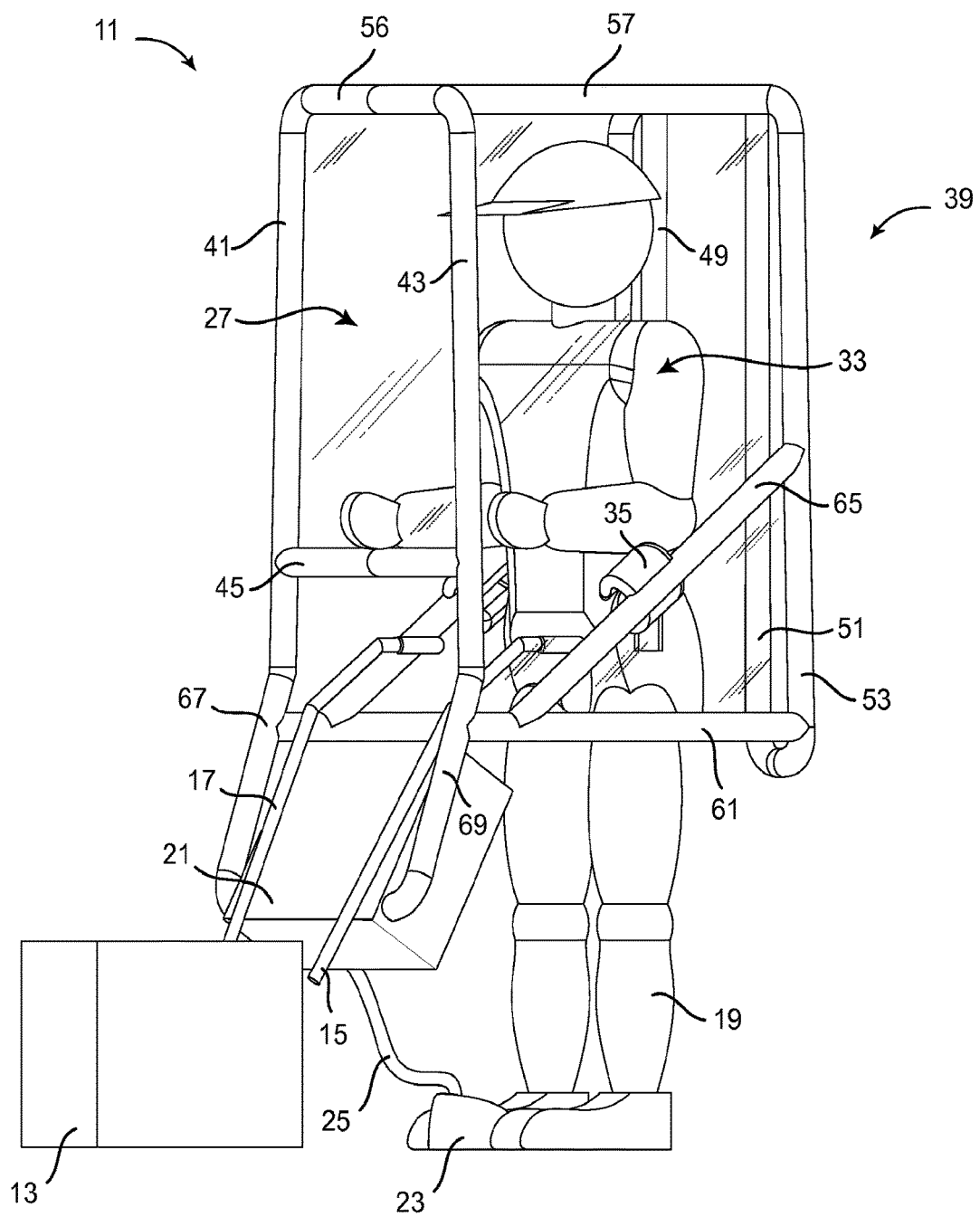
FIG. 1A is a pictorial view of an individual operating a push snow blower or walk-behind device with an inflatable cab installed thereon in accordance with an embodiment of the present disclosure.
Figure 1B:
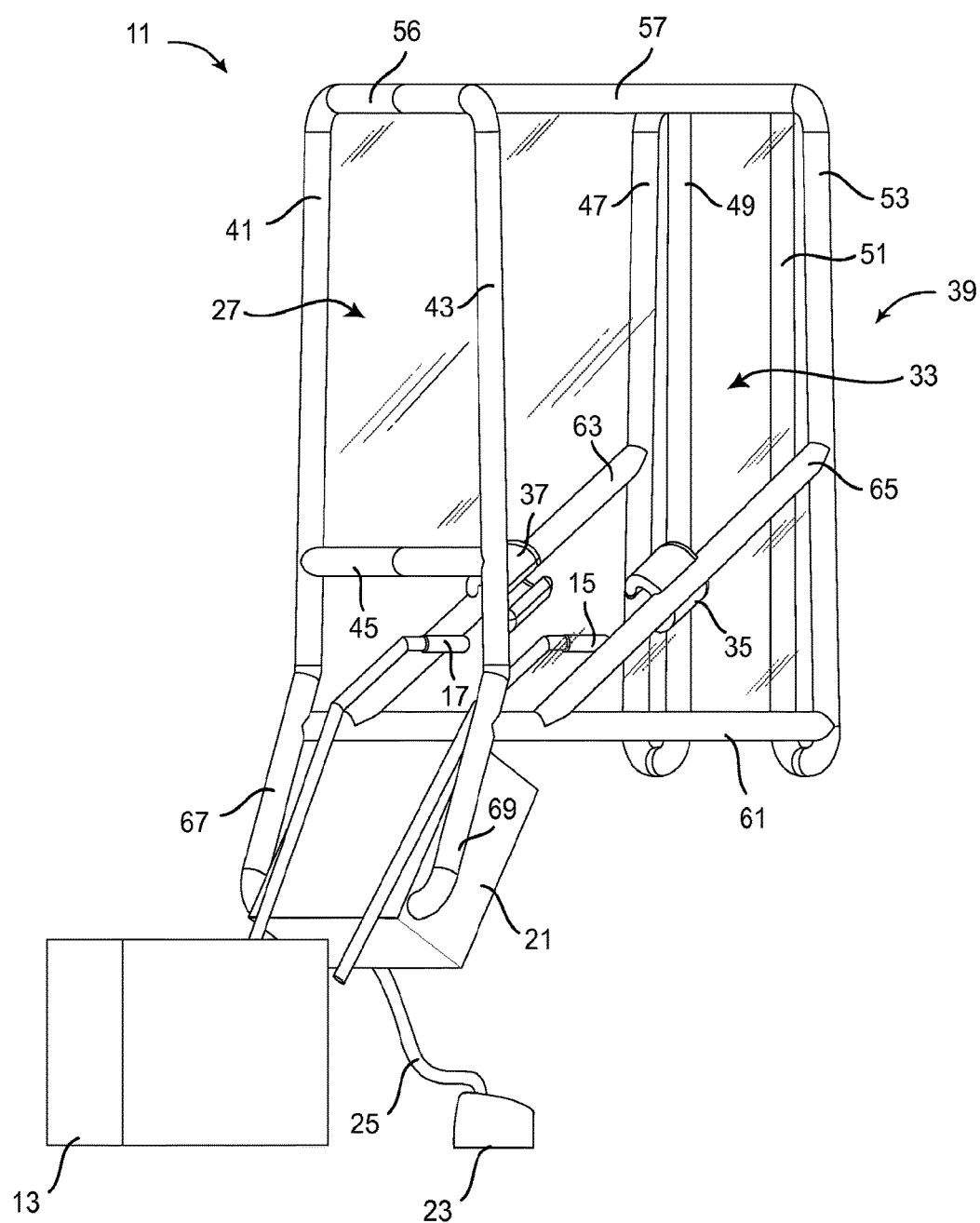
FIG. 1B is a pictorial view of the push snow blower or walk-behind device with an inflatable cab as shown in FIG. 1A with the operator removed.

It should be understood that the drawing(s) is for purposes of illustrating the concepts of the disclosure and is not necessarily the only possible configuration for illustrating the disclosure.

DETAILED DESCRIPTION

Preferred embodiments of the present disclosure will be described hereinbelow with reference to the accompanying drawings. In the following description, well-known functions or constructions are not described in detail to avoid obscuring the present disclosure in unnecessary detail. Herein, the phrase "coupled" is defined to mean directly connected to or indirectly connected with through one or more intermediate components.

All examples and conditional language recited herein are intended for educational purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Referring to the FIGS. 1-6, an inflatable cab 11 coupled to a walk-behind or mechanical device 13 is shown in accordance with an embodiment of the present disclosure. It is to be appreciated that a mechanical device can be any type of device used for outdoor work that includes a compartment or space for an operator to sit or stand to operate the device, i.e., a ride-on device or a walk-behind device. For example, a walk-behind device may include, but is not limited to, a lawn mower, a snow blower, etc. A ride-on device may include, but is not limited to, a ride-on tractor, ride-on lawn mover, an ice-resurfacing machine, etc. Furthermore, it is to be appreciated that the walk-behind device 13 shown in FIGS. 1-6 may be manual (e.g., a push type) or powered (e.g., electric, gas, etc.).

The device 13 shown in FIGS. 1-6 includes two handlebars 15, 17 extending rearwardly, which an operator 19 holds onto to drive or steer the device 13. An operator's cab or enclosure 11 provides protection for the operator 19 from inclement weather, including blowing snow, winds, and the like. The cab 11 is stored in a storage device 21, e.g., a box or pouch, which is attached to the walk-behind device 13. As shown in FIGS. 1-6, the storage device 21 is supported between the handlebars 15, 17, although it is to be appreciated that the storage device 21 may be coupled to the walk-behind device 13 in other ways and other locations.

In one embodiment, when the box or pouch 21 is opened, the operator 19 may remove or withdraw the deflated cab 11 along with a foot pump 23 for inflating the cab 11. The storage device 21 could then be closed by the operator 19. The foot pump 23 is placed on the floor and subsequently pressed repeatedly to push air through the hose 25 and into the cab 11, resulting in its inflation.

Figure 2A:
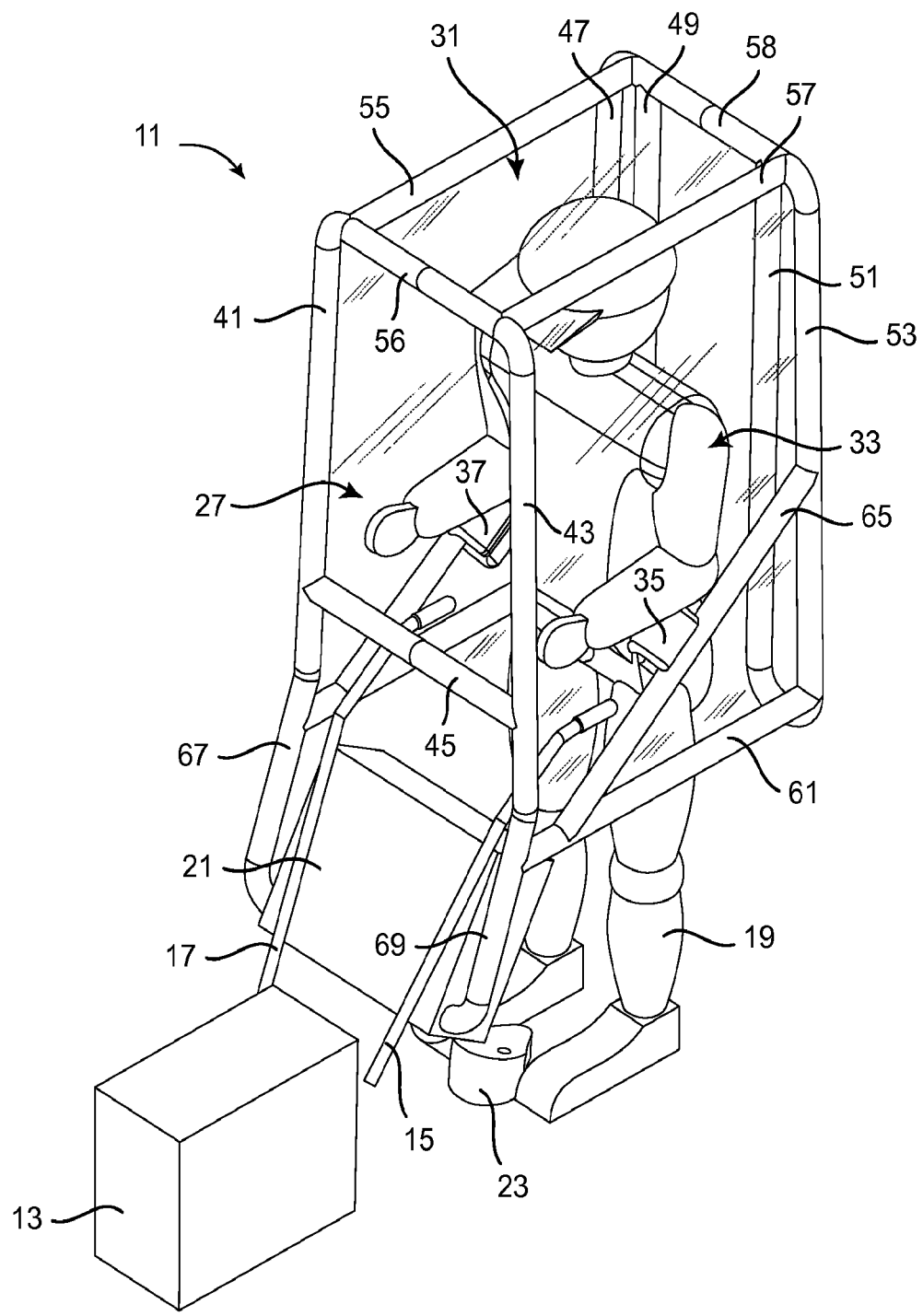
FIG. 2A is a perspective view of an individual operating a push snow blower or walk-behind device with an inflatable cab installed thereon in accordance with an embodiment of the present disclosure.
Figure 2B:
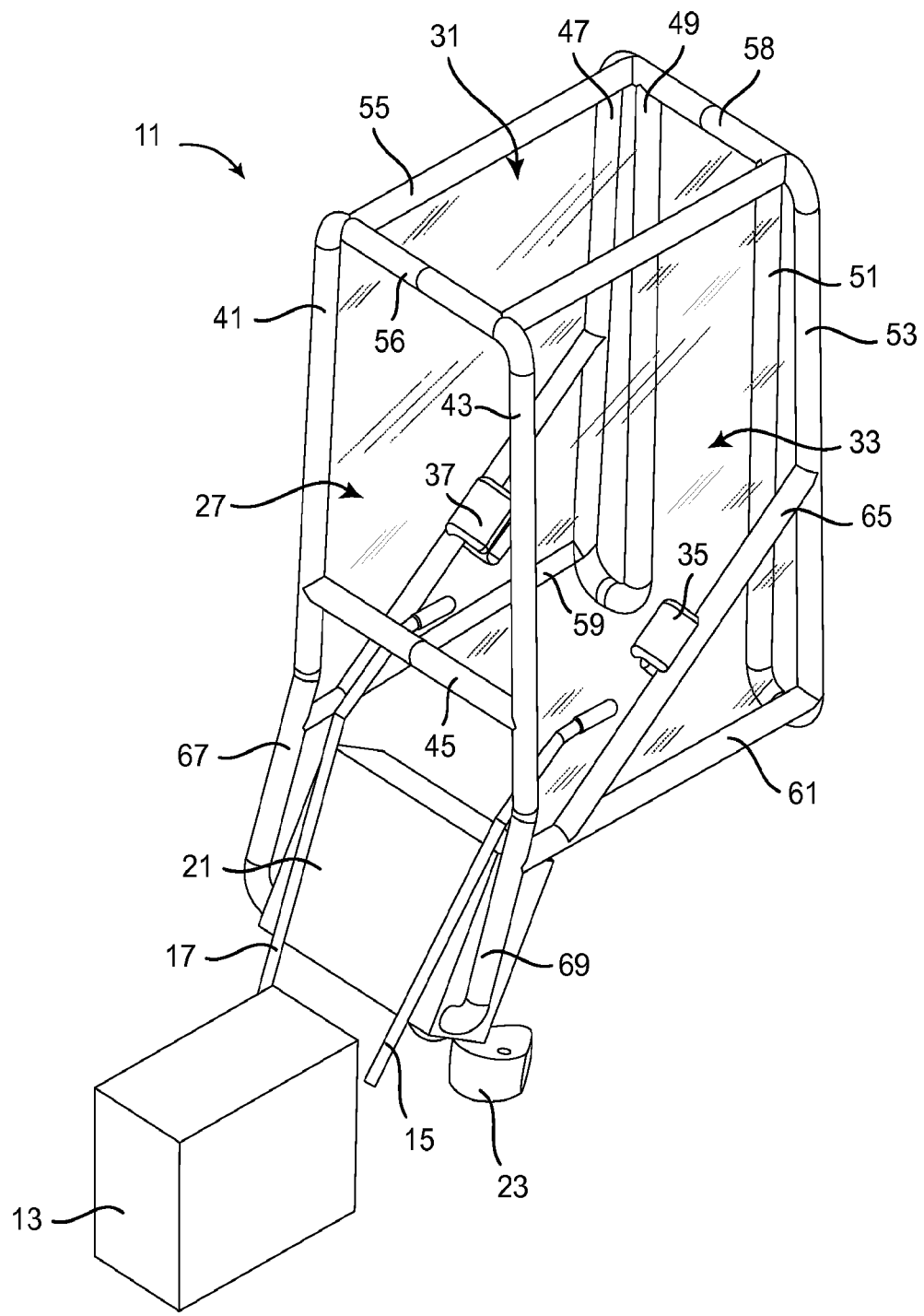
FIG. 2B is a perspective view of the push snow blower or walk-behind device with an inflatable cab as shown in FIG. 2A with the operator removed.

The protective enclosure or cab 11 includes an inflatable frame structure 39 which supports a plurality of transparent, flexible windows or sheet material, as will be described below. It is to be appreciated that the flexible windows or sheet material may be made of any transparent, flexible material, such as, but not limited to, plastic, vinyl, nylon, etc. In one embodiment, the cab 11 is generally rectangular and includes a generally flat roof or top 31 (as seen in FIG. 2A) made of a transparent plastic window or sheet material, where the top 31 is coupled to posts 55, 56, 57, 58. The transparent window allows light to penetrate through the cab 11 while still protecting the operator from inclement weather. It is to be appreciated that in an alternative embodiment, the top 31 may be different shapes. For example, top 31 may be a round or a cone shape as desired to decrease the buildup of snow or other weather elements that cab 11 may be exposed to. Furthermore, it is to be appreciated that in an alternative embodiment, top 31 may be made of an opaque material that does not allow light to pass into the interior of cab 11.

When inflated, the inflatable tube mechanism or frame 39 of cab or enclosure 11 provides a strong semi-rigid structure. It is to be appreciated that inflatable frame structure 39 includes a plurality of inflatable tubes or posts that are coupled together to form inflatable frame structure 39. In one embodiment, the inflatable tubes or posts are made from an extruded thermoplastic material; however, other materials are contemplated to be within the scope of the present disclosure. The first front post 41 is coupled to the storage device 21 that houses the inflatable cab 11 when not in use. A first front post 41 is also connected to the first roof post 55 and second roof post 56. A second front post 43 is coupled to the storage device 21. The second front post 43 is also connected to the third roof post 57 and second roof post 56. A first lower lateral post 59 connects a first lower post 67 and first rear post 47. A second lower lateral post 61 connects the second lower post 69 and fourth rear post 53. A first lateral post 63 connects the first lower lateral post 59 and the first rear post 47. A second lateral post 65 connects to the second lower lateral post 61 and the fourth rear post 53. The first lower post 67 connects to the storage device 21 and the first front post 41. The second lower post 69 connects to the storage device 21 and the second front post 43.

It is to be appreciated that all of the posts are coupled together such that air will pass through each post until the volume of the collective posts is filled to make the frame 39 semi-rigid. In other embodiments, the plurality of posts may be grouped into sections where each section is filled separately, for example, post 67 may provide air for inflation to a first section of coupled posts and post 69 may provide air for inflation to a second plurality of coupled posts.

The front of the cab 11 is made of a transparent window 27 providing a clear unobstructed view and protection from the elements. Transparent window 27 is coupled to posts 41, 43, 45, 56. A first side of the cab 11 is made of a transparent window 29 providing a clear unobstructed view and protection from the elements. Transparent window 29 is coupled to posts 41, 47, 55, 59, 63. A second side of the cab 11 is made of a transparent window 33 providing a clear and unobstructed view and protection from the elements. Transparent window 33 is coupled to posts 43, 53, 57, 61, 65. The transparent windows 27, 29, 31, 33 provide an unencumbered line of sight of the operator to observe not only the operation of the mechanical device, but also the adjacent terrain. It is to be appreciated that, in alternative embodiments, transparent windows 29 and 33 may be made of opaque material to block out sunlight entering cab 11 from either side of operator 19.

Figure 2C:
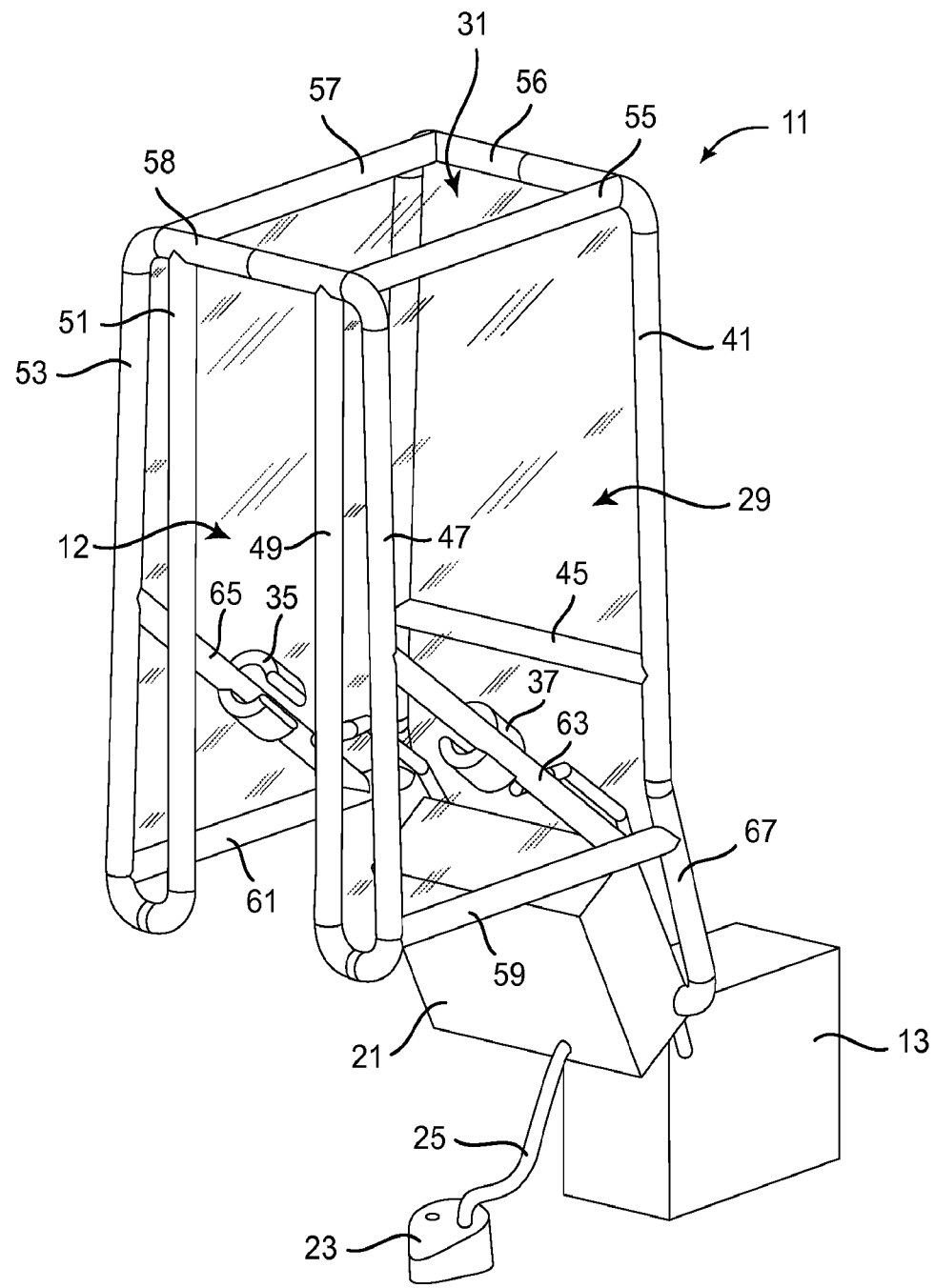
FIG. 2C is a rear perspective view of the push snow blower or walk-behind device with an inflatable cab as shown in FIG. 2A with the operator removed.
Figure 2D:
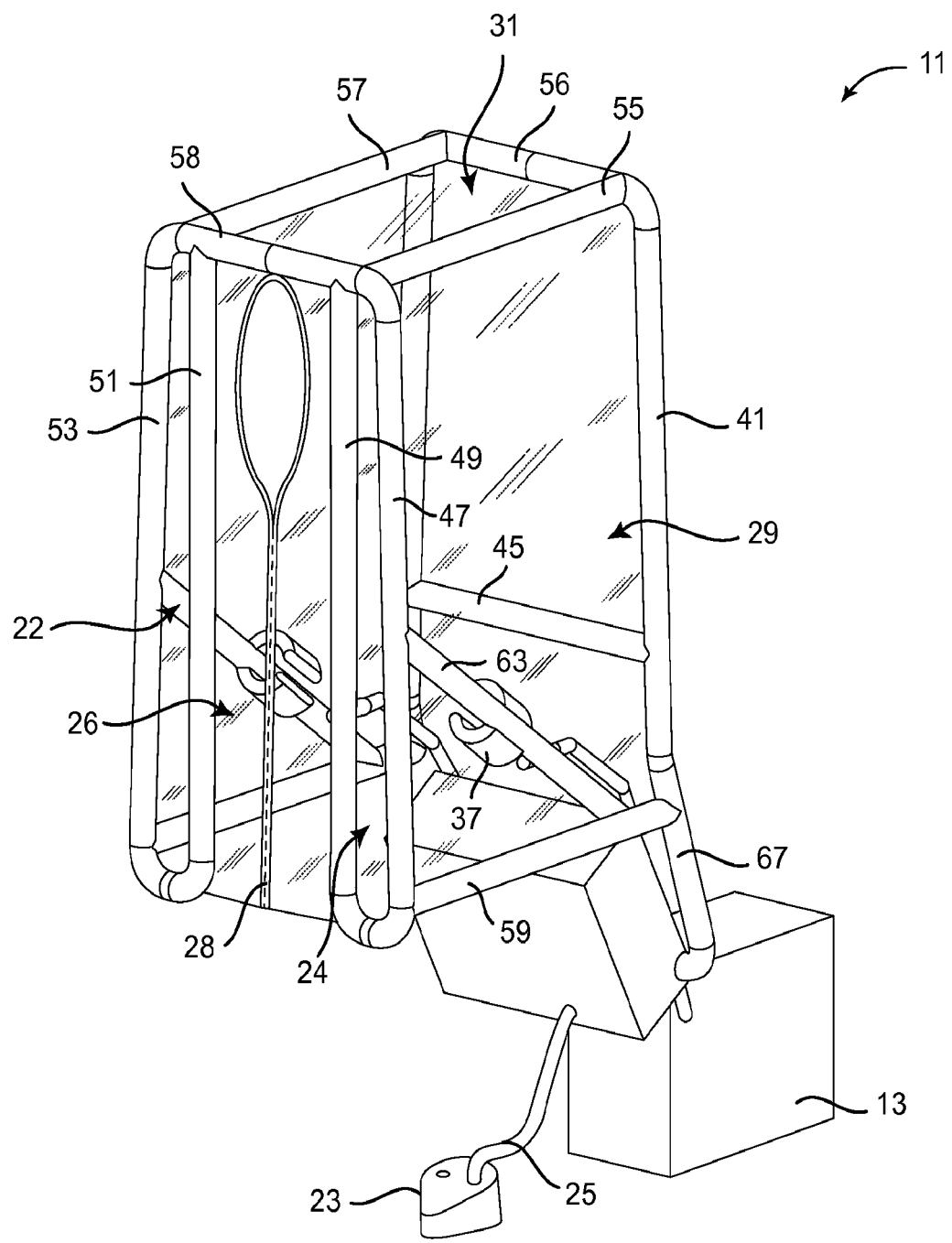
FIG. 2D is a rear perspective view of an inflatable cab in accordance with another embodiment of the present disclosure.
Figure 3:
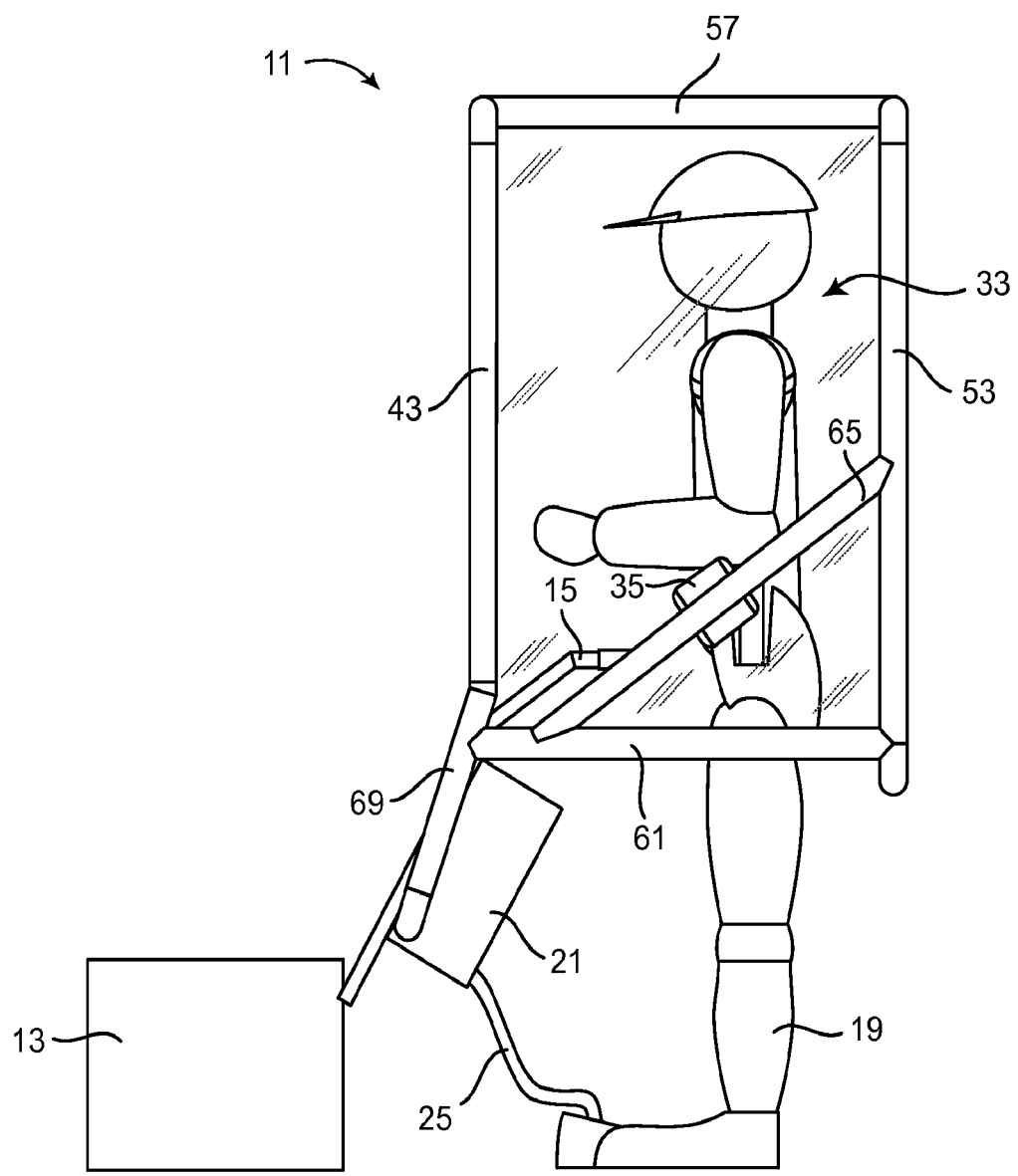
FIG. 3 is a side view of an individual operating a push snow blower or walk-behind device with an inflatable cab installed thereon in accordance with an embodiment of the present disclosure.
Figure 4:
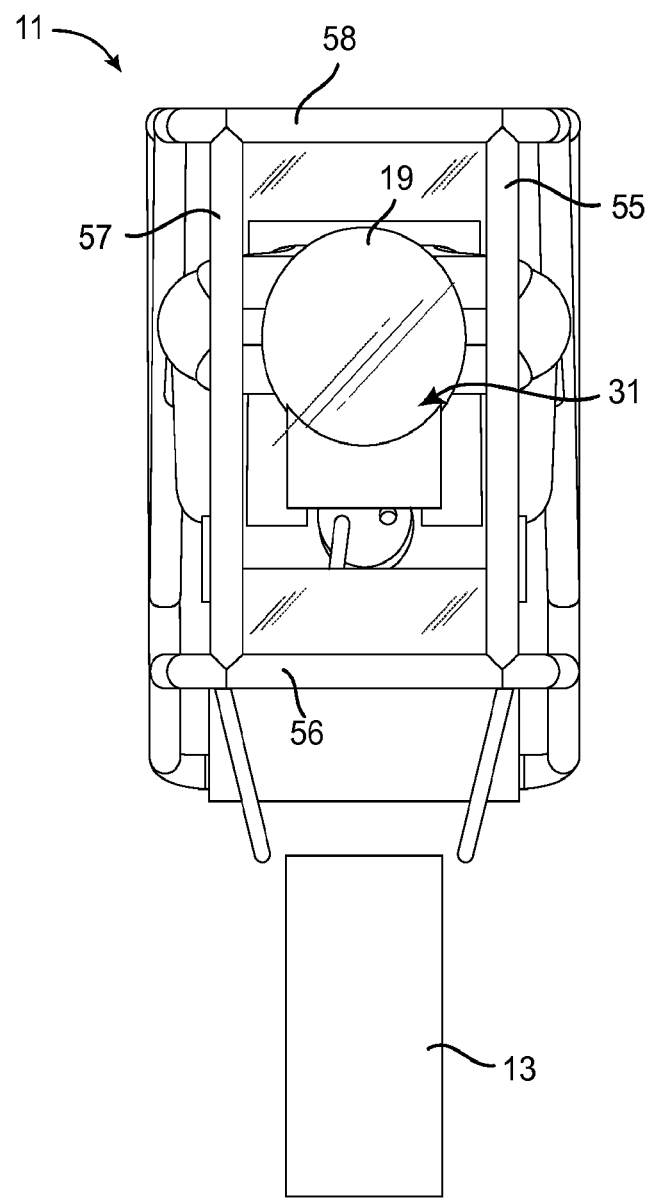
FIG. 4 is a top view of an individual operating a push snow blower or walk-behind device with an inflatable cab installed thereon in accordance with an embodiment of the present disclosure.
Figure 5:
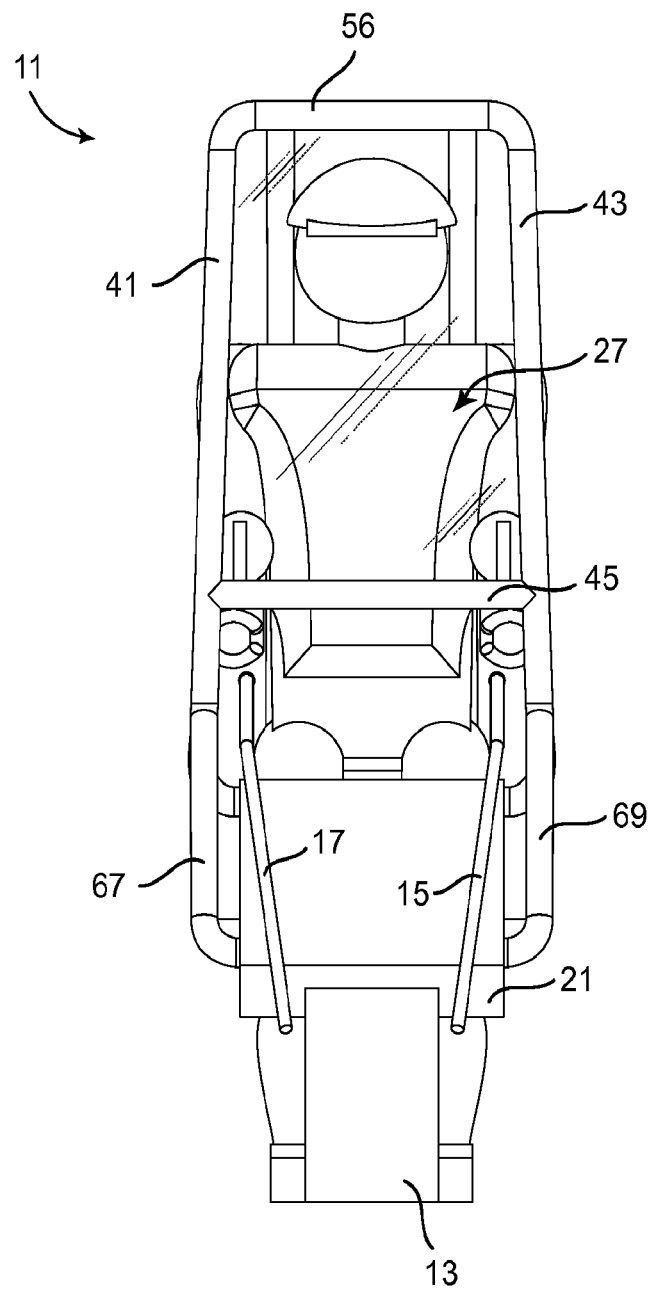
FIG. 5 is a front view of an individual operating a push snow blower or walk-behind device with an inflatable cab installed thereon in accordance with an embodiment of the present disclosure.

As shown most clearly in FIG. 2C, the back or rear portion of the cab 11 has a gap or opening 12, where, for example, in one embodiment, gap 12 may be a 12" spacing. The length of gap 12 is chosen such that the operator 19 can enter and exit into the interior of cab 11. It is to be appreciated that in some embodiments, the back of the cab 11 may also include one or more transparent windows. For example, turning to FIG. 2D, cab 11 is shown, where cab 11 includes transparent windows 22, 24, and 26. Transparent window 22 is coupled to posts 51 and 53, transparent window 24 is coupled to posts 47 and 49, and transparent window 26 is coupled to posts 49, 51, 58. In some embodiments, transparent window 26 may include a slit in the center of the transparent window 26 to allow easy entry and exit into and out of cab 11 by the operator 19. The slit may be fastened together by fastening mechanism 28 including, but not limited to, a fabric hook and loop fastener, clasp locker, buckle, snap tape, hook and eye tape, button loops, frog closure or knot buttons. For example, in the embodiment shown in FIG. 2D, transparent window 26 includes a clasp locker or zipper, that operator 19 can engage to fasten transparent window 26 together. In another embodiment, transparent window 26 may be a solid piece of transparent plastic or other flexible sheet material.

It is to be appreciated that in some embodiments, the storage device 21 contains an inflation mechanism, which inflates the tube mechanism or frame 39. In one embodiment, the inflation mechanism is a foot pump 23 (shown in FIGS. 1-5), which the operator 13 may press with his foot to send air through the hose 25 to the tube mechanism 39. The foot pump 23 may be made of various materials, such as, but not limited to, PVC plastic, rubber, etc. To inflate cab 11, the operator 19 pushes the pump 23 with his/her foot. When operator pushes pump 23 with his/her foot, air is sucked into the container through the air intake area. When the foot is lifted off of the pump 23 the air intake is closed off, and the only way for the air to escape is through the hose 25 and ultimately into the inflatable tube mechanism 39.

In another embodiment, the inflation mechanism may be a valve or hole in which the operator 19 can blow air into the valve or hole and into the tube mechanism 39 until the tube mechanism 39 is full and firm. The operator 19 may then close the valve or hole as to prevent the air from leaking.

In yet another embodiment, the inflation mechanism may be a manual pump, electric pump, or the like. The operator 19 may insert the pump's nozzle into a hole or valve opening, and if using an automatic pump, turn it on. If the operator 19 is using a manual pump, the operator 19 may start pumping until the tube mechanism 39 is filled to the point that it is fully inflated and firm to the touch. Subsequently, the operator 19 may screw the valve or hole cap back on to trap the air inside. An electric pump may be powered by a vehicles battery, a house power outlet, etc.

In another embodiment, the inflation mechanism may be a reusable container or canister of compressed gas. For example, the container or canister of compressed gas will be stored in storage device 21. When operator 19 desires to inflate tube mechanism 39, operator 19 will connect the container or canister of compressed gas to a valve disposed on the tube mechanism 39. Once connected, the container or canister of compressed gas will inflate the tube mechanism 39 as described above. After the tube mechanism 39 has been inflated, the container or canister will be disposed of and another container or canister of compressed will be used for the next time that operator 19 desires to inflate tube mechanism 39. In certain embodiments, the contianer or canister may be refilled with compressed gas after each use.

The cab 11 may also contain a deflation mechanism, which may be in the form of a valve coupled to the tube mechanism or frame 39. To deflate cab 11, the operator 19 can pull out the valve cover and allow the air to escape. Once the tube mechanism 39 is fully deflated, the cab 11 can be rolled up and stored in the storage device 21, as shown in FIG. 6.

In another embodiment, the storage device 21 may contain an electric deflation mechanism. To deflate tube mechanism 39, the operator can press a switch that vacuums the air out of the tube mechanism 39 and out through a hole or valve. Subsequently, the operator 19 could roll up the cab and place it back into the box or pouch 21.

Figure 6:
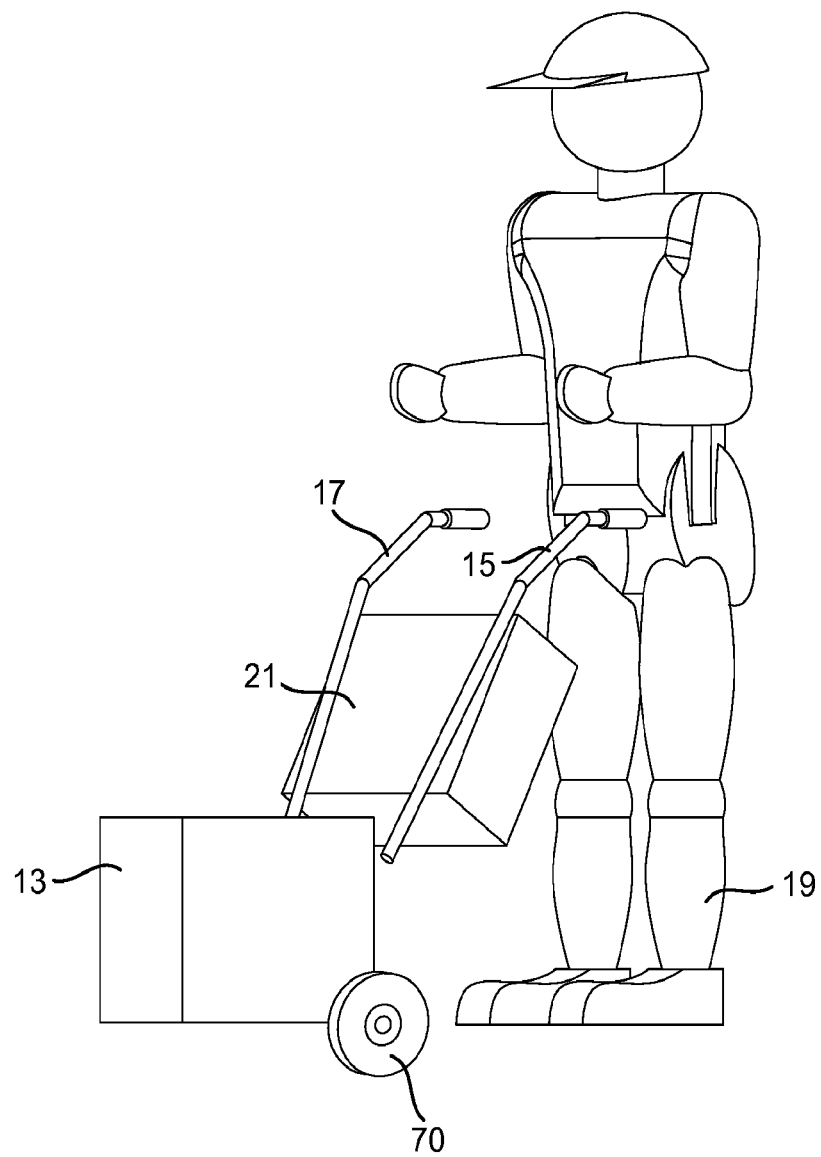
FIG. 6 is a perspective view of an individual operating a walk-behind device with an inflatable cab disposed in a storage device coupled to the walk-behind device in accordance with an embodiment of the present disclosure.

As shown in FIG. 6, storage device 21 is coupled to walk-behind device 13. It is to be appreciated that, as stated above, walk-behind device 13 may be one of many different types of walk-behind devices. For example, walk-behind device 13 may be a snow blower similar to the snow blower disclosed in commonly owned U.S. Pat. No. 9,032,650, the contents of which are hereby incorporated by reference herein. Various walk-behind devices include a pair of drive wheels 70 with a driving motor situated over the axle interconnecting these wheels and at least one handle 15, 17 for controlling or steering the walk-behind device. It is to be appreciated that the teachings of the present disclosure may be applied to other devices such as tractors, ride-on mowers and the like.

In one embodiment, at least one cuff 35, 37 is provided to stabilize the frame structure 39. The operator's cab 11 includes a cuff 37 on the first lateral post 63, and a second cuff 35 on the second lateral post 65. The cuff could be made of nylon, plastic, etc. The cuff may be hard, soft, etc. The cuff may be adjustable. In one embodiment, the cuff is closed by the use of a fabric hook and loop fastener.

In another embodiment, the cuff 35, 37 is inflatable. The cuff 35, 37 may be inflated using the operator's breath, a manual pump, an automatic pump, etc. The cuffs 35, 37 may be flattened by turning a valve, or a hole and deflating the cuff 35, 37. An inflatable cuff facilitates repacking and storing the cab when not in use.

Upon entry into cab 11, the operator 19 may dispose his right arm in the first cuff 37 and left arm in the second cuff 35. The cuffs 37, 35 act as a stabilization mechanism for the cab 11. In other words, the operator, via the cuffs 35, 37 and posts 63, 65 provide stability to the right and left side of the cab 11. The operator may then grab the first handlebar 15 with his left hand, and second handlebar 17 with his right hand to control the walk-behind device 13. It is to be appreciated that although in FIGS. 1-6 walk-behind device 13 has been shown including handlebars 17 and 15, in alternative embodiments, walk-behind device may include a single horizontal handlebar. It is to be appreciated that the cuffs 35, 37 may include various types of fasteners to secure an operator's arm including, but not limited to, a clasp locker, a buckle, snap tape, hook and eye tape, button loops, frog closures and knot buttons, etc.

In another embodiment, the bottom of the operator's cab 11 may contain a member or piece of plastic, rubber, etc., to enclose the lower portion of the cab. The member or plastic may include a slit with a zipper, similar to transparent window 26 shown in FIG. 2D. Alternatively, this member or plastic may include an aperture located in the center of the member or plastic in which the operator 19 may stand in. The periphery of the aperture may include elastic or draw strings to vary the size of the aperture so that when operator 19 is standing in the aperture, operator 19 has a more enhanced protection from any exterior elements. The operator's 19 upper body will then be fully enclosed in the operator's cab 11. It is to be appreciated that the elastic or draw strings will be configured such that the edges of the aperture will be biased towards operator 19.

In another embodiment of the present disclosure, a cab or protective apparatus may be configured such that the cab or protective apparatus is not coupled to a storage device (as shown in FIGS. 1-6). For example, turning to FIGS. 7A-10, a cab 111 is shown, where cab 111 may be coupled to a mechanical device or walk-behind device, such as walk-behind device 13. Similar to cab 11, cab 111 includes a plurality of inflatable tubes coupled together to form an inflatable structure for an operator 19 to enter. Furthermore, cab 111 includes a plurality of flexible transparent windows or sheet material to provide further protection to operator 19 when cab 111 is in use with a mechanical device or a walk-behind device such as walk-behind device 13. In one embodiment, the tube structure is covered by a single sheet of material, e.g., a curtain, as will be described in more detail below in relation to FIG. 11.

Cab 111 includes an inflatable frame structure which includes posts 167, 141, 156, 143, 169, 145, 159, 163, 147, 155, 158, 157, 151, 153, 165, and 161. Specifically, post 167 is coupled to posts 141, 163, 159, and 145. Post 169 is coupled to posts 143, 165, 161, and 145. Posts 163 and 159 are each coupled to post 147. Posts 165 and 161 are each coupled to post 153. Posts 141 and 143 are each coupled to post 156. Posts 147 and 153 are each coupled to post 158. Posts 156 and 158 are each coupled to posts 155, 157, and 151.

The collective posts form the frame structure, which in certain embodiments, is covered with a sleeve arrangement 138. The sleeve arrangement 138 is configured in substantially the same shape as the frame structure, where the sleeve arrangement 138 is configured to cover each tube or post. The sleeve arrangement 138 may be a cloth or woven fabric (e.g., cotton, polyester, nylon, canvas, etc.) sewn together in substantially the same shape as the frame structure to contain the frame structure therein.

Figure 7A:
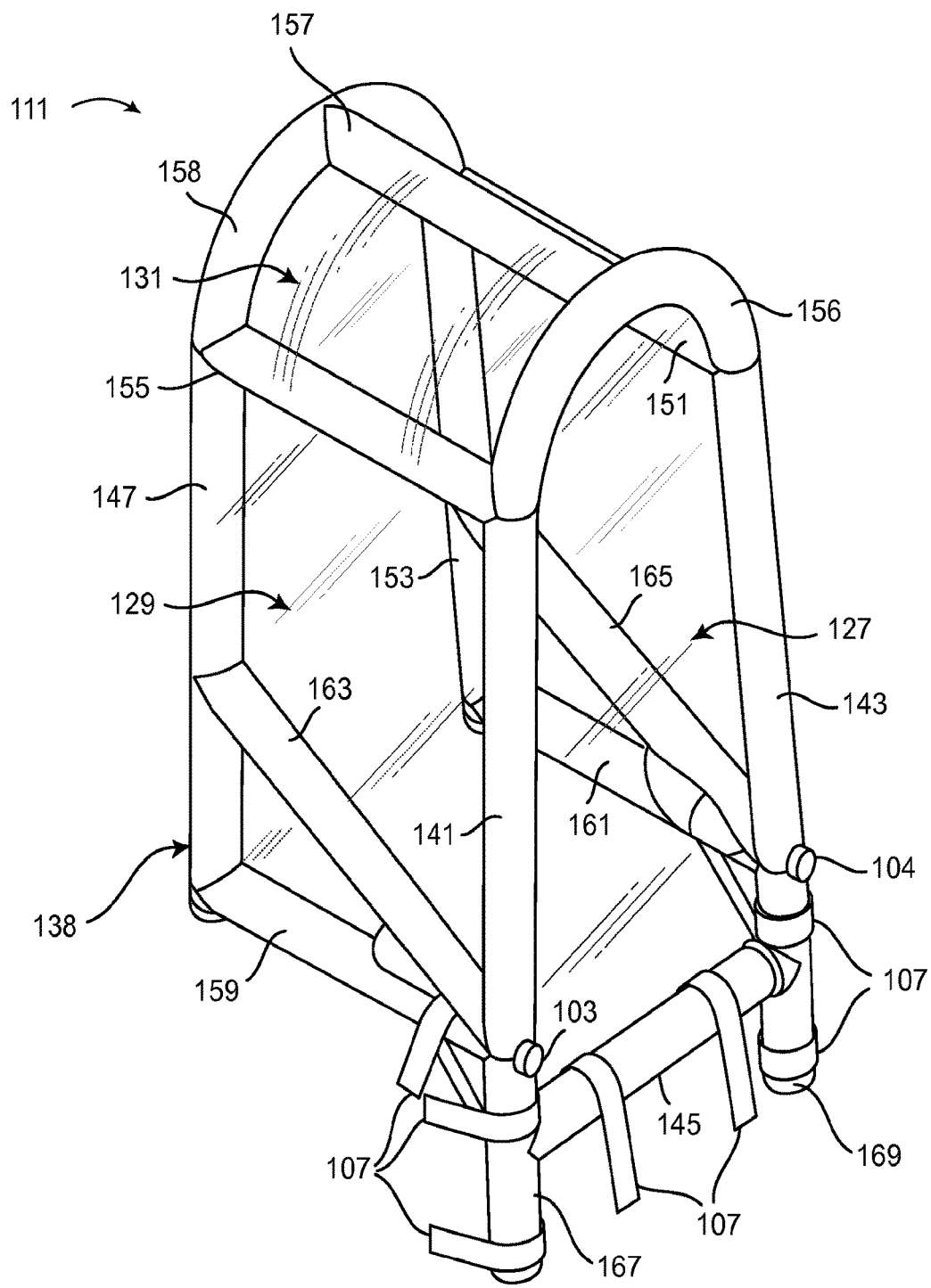
FIG. 7A is a perspective view of an inflatable cab in accordance with another embodiment of the present disclsoure.
Figure 7B:
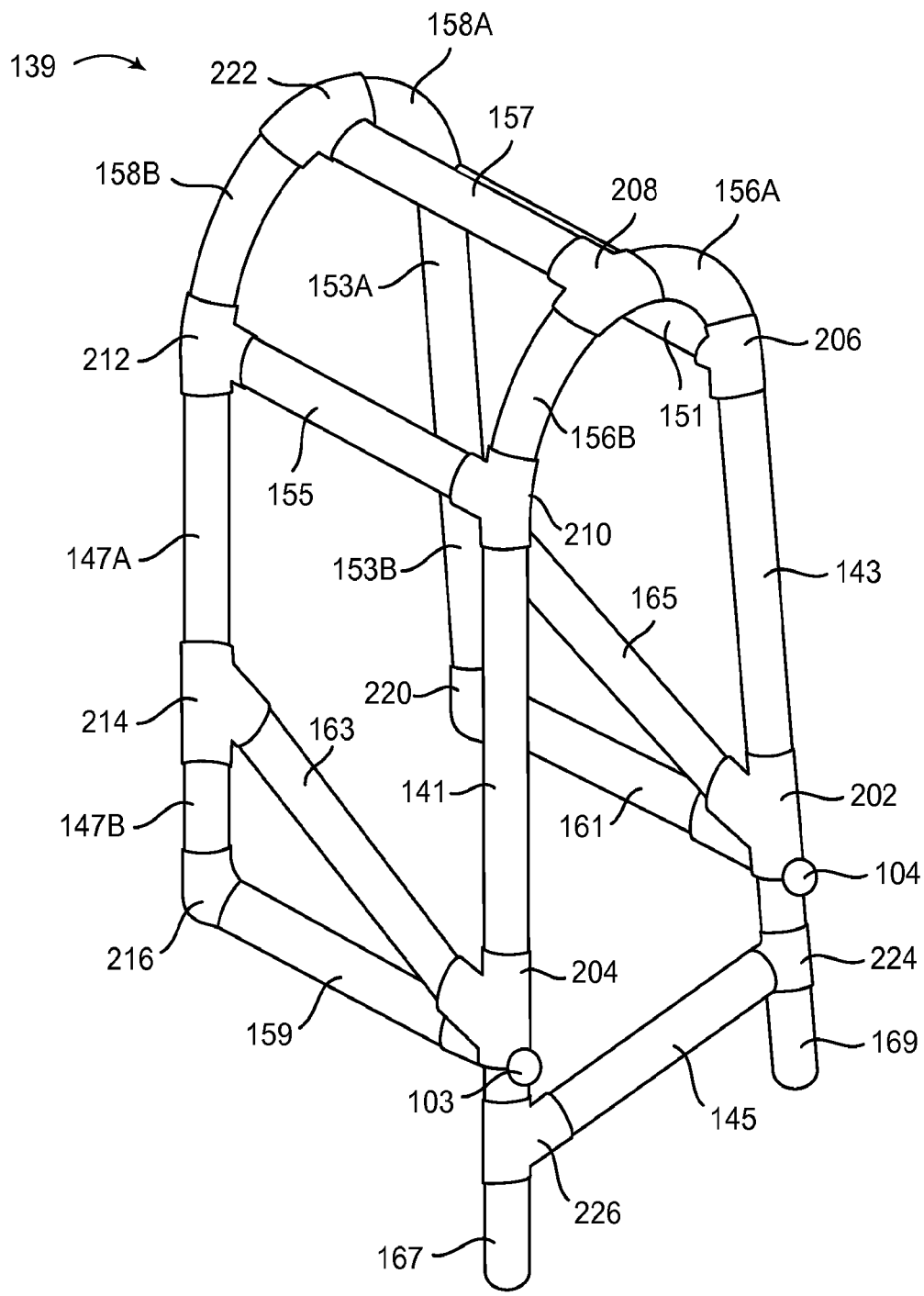
FIG. 7B is a perspective view of a frame structure in accordance with an embodiment of the present disclosure.

Referring to FIG. 7B, the frame structure 139 is shown with the cloth material or sleeve arrangement 138 removed. As can be seen from FIG. 7B, the posts are coupled together via a plurality of coupling member, e.g., coupling members 202, 204, 206, 208, 210, 212, 214, 216, 218, 220, 222, 224 and 226. While each posts is made from an inflatable material, e.g., plastic, the coupling members are generally rigid, for example, like a PVC piping coupling. It is to be appreciated that each tube or post may be joined or coupled to a particular coupling member by any various known means, e.g., bonding, gluing, welding, etc. It is further to be appreciated that the joining means or material for joining the tube or post to the coupling member may be removable or displaceble so a particular tube or post may be replaced if compromised, e.g., punctured or cannot hold air.

In certain embodiments, a particular post may be constructed from two small posts, e.g., post 156 shown in FIG. 7A may be configured as post 156A coupled to post 156B via coupling 208; post 158 shown in FIG. 7A may be configured as post 158A coupled to post 158B via coupling 222; post 153 shown in FIG. 7A may be configured as post 153A coupled to post 153B via a coupling (not shown); and post 147 shown in FIG. 7A may be configured as post 147A coupled to post 147B via coupling 214.

Additionally, post 158B is coupled to post 147A via coupling 212. Post 147B is coupled to post 159 via coupling 216. Post 159 is coupled to posts 163, 141, and 167 via coupling 204. Post 167 is coupled to post 145 via coupling 226. Post 145 is coupled to post 169 via coupling 224. Post 141 is coupled to posts 155 and 156B via coupling 210. Post 156A is coupled to posts 143 and 151 via coupling 206. Post 143 is coupling to posts 165, 161, and 169 via coupling 202. Post 161 is coupled to post 153B via coupling 220.

In certain embodiments, the sleeve arrangement 138 includes a slit or opening (with an appropriate fastener, e.g., a zipper, hook and loop fastener, etc.) to insert each tube or post into a corresponding portion of the sleeve arrangement 138. In this manner, a particular post or tube may be replaced if the tube or post is compromised, e.g., punctured. It is to be appreciated that the sleeve arrangement 138 confines the frame structure to its intended shape and, in certain embodiments, is made from an inelastic material or fabric to constrain the frame structure to prevent the frame structure from coming apart, e.g., at a joint or coupling member, during inflation. Additionally, when an inelastic material or fabric is employed, the sleeve arrangement 138 restrains each tube or post to prevent exceeding the inflation limit of each tube or post.

Figure 8:
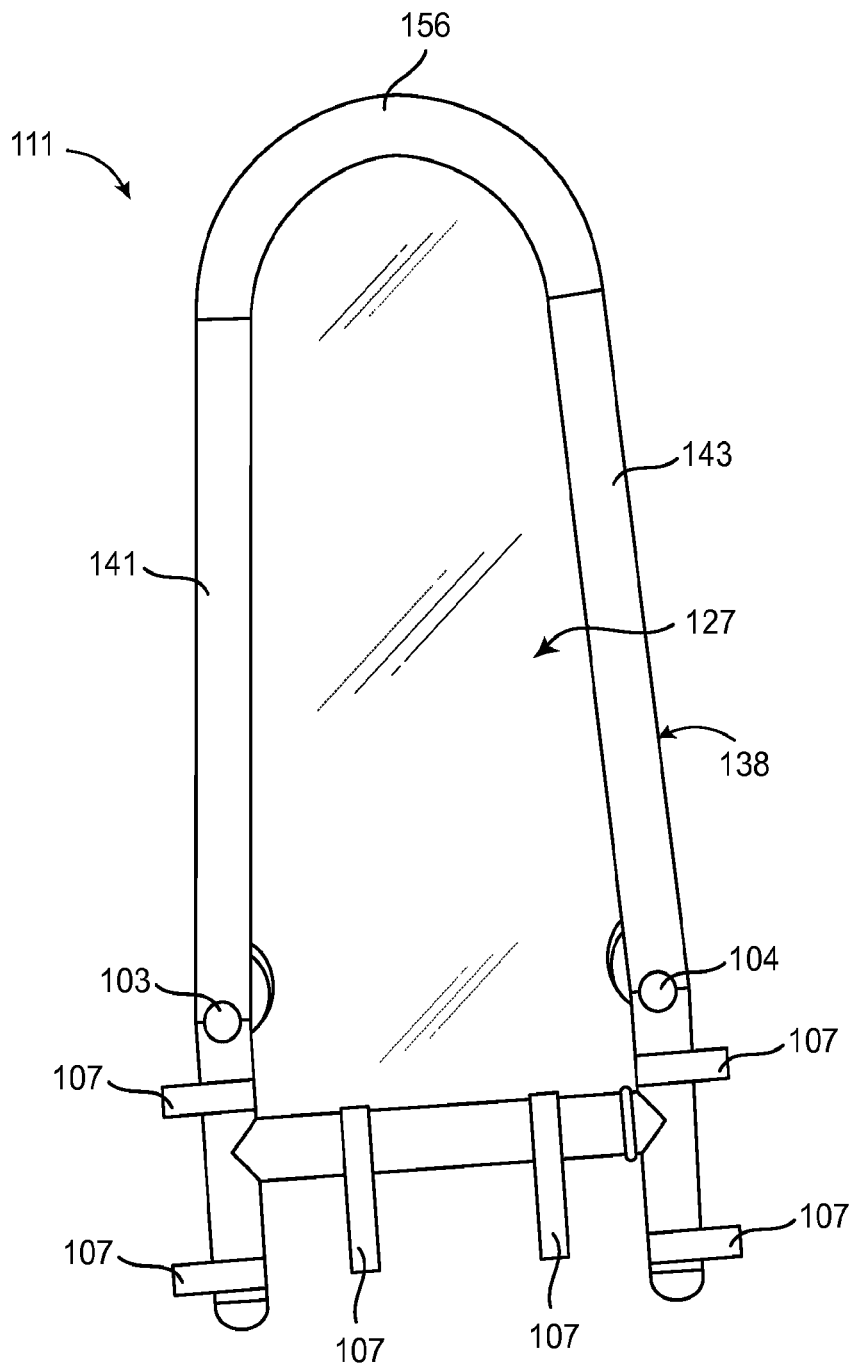
FIG. 8 is a front view of the inflatable cab shown in FIG. 7.
Figure 9:
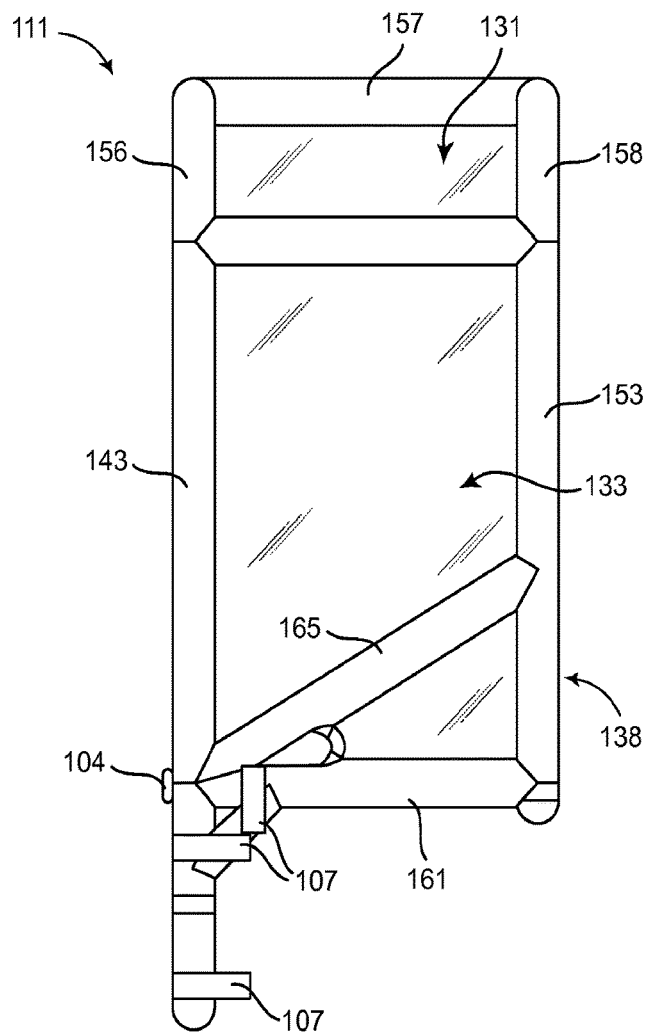
FIG. 9 is a side view of the inflatable cab shown in FIG. 7.
Figure 10:
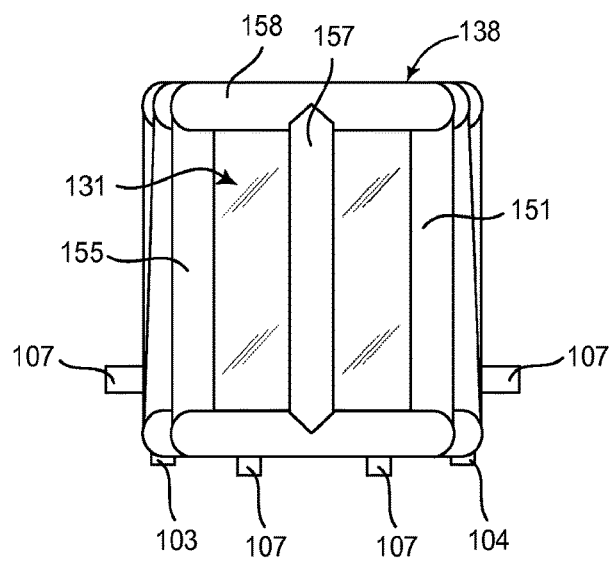
FIG. 10 is a top view of the inflatable cab shown in FIG. 7.

Referring back to FIG. 7A and also referring to FIGS. 8-10, cab 111 includes transparent windows 127, 129, 131, and 133. Specifically, transparent window 127 is coupled to posts 145, 141, 156, and 143. Transparent window 129 is coupled to posts 159, 163, 141, 147, and 155. Transparent window 133 is coupled to posts 161, 165, 143, 151, and 153. Transparent window 131 is coupled to posts 156, 155, 157, 151, and 158. It is to be appreciated that, similar to cab 11, the transparent windows in cab 111 may be made of any flexible transparent sheet material as described above. Furthermore, it is to be appreciated that, in some embodiments, one or more of transparent windows 127, 129, 131, and 133 may be made of an opaque material to block light from entering the interior of cab 111. Furthermore, it is to be appreciated that the combination of transparent window 131 and posts 156, 155, 157, 151, and 158 form a dome structure at the top of cab 111 that protects the operator 19 from any weather elements occurring exterior to cab 111.

Additionally, in some embodiments of cab 111, cab 111 includes a gap or opening disposed between posts 147 and 153. The gap or opening disposed between posts 147 and 153 enables operator 19 to enter the interior of cab 111 when cab 111 has been inflated. It is to be appreciated that in alternative embodiments, cab 111 may include a transparent window coupled to posts 153, 158, and 147 (similar to transparent window 26) with a slit and a zipper to enable operator 19 to seal the rear portion of cab 111 after operator 19 has entered cab 111.

In some embodiments, cab 111 will include another transparent window or sheet material coupled to posts 159, 145, and 161. The transparent window or sheet material will include an aperture with an elastic band or draw strings to bias the periphery of the aperture towards the lower half of operator 19 to provide additional protection to operator 19 from any weather related elements occurring outside the interior of cab 111.

Figure 11:
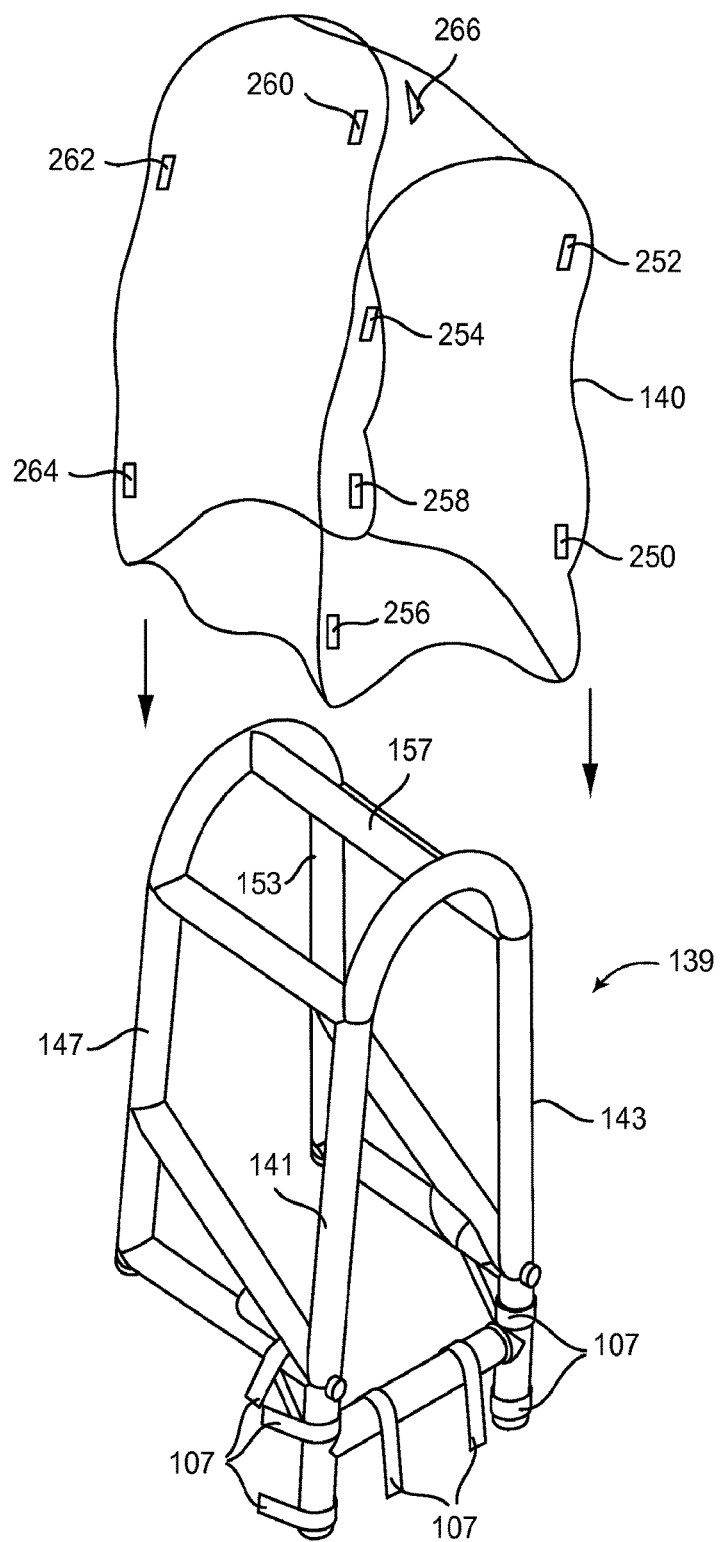
FIG. 11 is an exploded perspective view of an inflatable cab in accordance with another embodiment of the present disclosure.

In one embodiment, the inflatable cab or enclosure 111 may include a single sheet of material to cover the frame structure instead of employing a plurality of windows. Referring to FIG. 11, an exploded view of the cab 111 is shown. In this embodiment, a single sheet of transparent material or a curtain 140 is configured to be disposed over the frame structure 139. In FIG. 11, the curtain or sheath 140 is generally rectangular with a curved, closed top portion, for example, similar to an inverted bag. However, other shapes for the curtain or sheath 140 are contemplated to be within the scope of the present disclosure. For example, the curtain or sheath 140 may include a gap or opening to align with a rear portion of the frame structure 139, similar to gap 12 shown in FIG. 2C. The curtain or sheath 140 may be made from any flexible, transparent material such as, but not limited to, plastic, vinyl, nylon cloth, etc., including other durable and water-proof material.

The curtain or sheath 140 further includes fastening members 250, 252, 254, 256, 258, 260, 262, 264, 266 disposed on an interior surface of the curtain or sheath 140 for securing the curtain or sheath to the frame members. For example, fastening members 250 and 252 secure the curtain 140 to post 143, fastening members 254 and 256 secure the curtain 140 to post 141, fastening members 258 and 260 secure the curtain 140 to post 153, fastening members 262 and 264 secure the curtain 140 to post 147 and fastening member 266 secures the curtain 140 to post 157.

In one embodiment, the fastening members are hook and loop fasteners, e.g., Velcro™ type fasteners, where the hook portion is placed on the interior surface of the curtain or sheath 140 and the loop portion is disposed on the corresponding post or vice versa. In one embodiment, the hook portion is placed on the interior surface of the curtain or sheath 140 which then couples to the material of the sleeve arrangement 138 (e.g., cloth, nylon, etc.) obviating the need for the loop portion to be disposed on the sleeve arrangement.

It is to be appreciated that the number of fastening members shown in FIG. 11 are exemplary and more or less fastening members may be used. Additionally, more fastening members may be employed in other locations of the curtain or sheath 140 to couple with different posts. Furthermore, other types of fastening members are comtemplated to be within the scope of the present disclosure.

To couple cab 111 to a walk-behind device, such as walk-behind device 13, cab 111 also includes coupling or fastening mechanisms 107, as shown in FIG. 7A and FIGS. 8-10. It is to be appreciated that coupling mechanisms 107 may be any fastening mechanism capable of fastening cab 111 to a walk-behind device after cab 111 has been inflated. It is further to be appreciated that the coupling mechanism 107 enables the cab 111 to be detachably installed on a mechanical device, that is, the cab 111 may be installed and removed from the mechanical device an unlimited amount of times. For example, fastening mechanisms 107 may be a fabric hook and loop fastener (as shown in FIGS. 7-11), clasp locker, buckle, snap tape, hook and eye tape, button loops, frog closure or knot buttons. It is to be appreciated that in various embodiments, any number of fastening mechanisms 107 may be included with cab 111 so that cab 111 may be coupled to various types of walk-behind devices. Furthermore, in various embodiments, fastening mechanisms 107 may be disposed on various locations of various posts of cab 111 so that cab 111 may be coupled to various types of walk-behind devices. For example, in FIGS. 7-11, cab 111 includes eight fastening mechanisms 107, where one fastening mechanism 107 is coupled to post 159, two fastening mechanisms 107 are coupled to post 167, two fastening mechanisms are coupled to post 145, two fastening mechanisms are coupled to post 169, and one fastening mechanisms are coupled to post 161.

As an example, cab 111 may be coupled to the walk-behind device 13 shown in FIGS. 1-6, by coupling the fastening mechanisms disposed on posts 159 and 167 to handlebar 17 and coupling the fastening mechanisms disposed on posts 161 and 169 to handlebar 15. It is to be appreciated that cab 111 is configured such that the fastening mechanisms may be used to couple cab 111 to walk-behind devices with various handlebar configurations. For example, the fastening mechanisms 107 disposed on post 145 may be used to coupled cab 111 to a walk-behind device with a horizontal handlebar.

In another example, the inflatable cab or enclosure 111 may be coupled to a snow blower similar to the snow blower disclosed in commonly owned U.S. Pat. No. 9,032,650, the contents of which are hereby incorporated by reference herein. Refering to FIG. 12, snow blower 350 includes a housing 352 containing a rotating spiral blade 354, driven by a small gasoline engine, which forces the snow into a chute 356 with sufficient force to cause it to be thrown a significant distance in a direction determined by the aiming of the chute 356. The snow blower 350 further includes a par of drive wheels 358 with the driving motor situated over the axle interconnecting these wheels. The housing 352 and blade 354 is situated forward of the wheels 358 and with the blade 354 connected to the drive motor via a belt. In use, an operator 19 stands to the rear of the snow blower 350, and via suitable controls, adjusts the speed of the rotor and the discharge direction of the chute 356 while steering the blower with the pair of rearwardly extending handles 360, 361. The housing 352 has a front open portion 362 through which snow enters and contacts the blade 354. The open portion 362 of the housing 352 is defined by a top peripheral edge 368 and two side peripheral edges 366.

Figure 12:
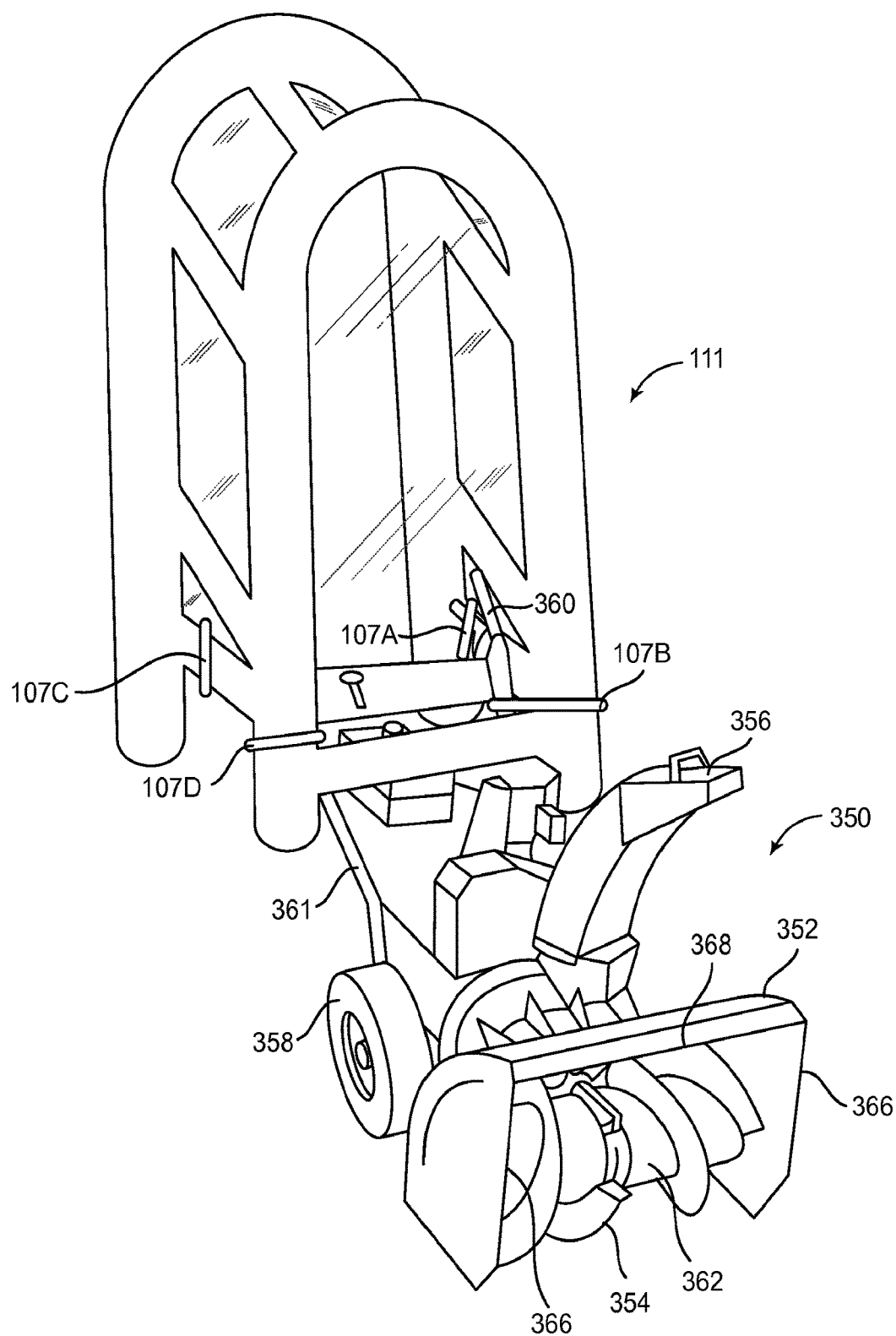
FIG. 12 is a perspective view of an inflatable cab coupled to a snow blower in accordance with the present disclosure.

As seen in FIG. 12, cab 111 is coupled to snow blower or walk-behind device 350. Specifically, fastening mechanisms 107A and B couple handle 360 to cab 111 and fastening mechanisms 107C and D couple handle 361 to cab 111. Although only 4 fastening mechanisms are shown in FIG. 12, it is to be appreciated that, many more fastening mechanisms 107 may be included to coupled cab 111 to a mechanical device or a walk behind device, such as snow blower 350. Furthermore, it is to be appreciated that fastening mechanisms 107 may be couple various posts of cab 111 to various components of snow blower 350.

Cab 111 also includes valves 103 and 104 to deflate and inflate cab 111, as shown in FIGS. 7A-B and FIGS. 8-9. Specifically, an inflation mechanism may be coupled to valve 104 to inflate cab 111. Furthermore, a deflation mechanism may be coupled to valve 103 to deflate cab 111. It is to be appreciated that valves 103 and 104 are configured such that various inflation and deflation mechanism may be coupled to valves 103 and 104. Such inflation and deflation mechanisms have been described above herein, and therefore, in the interest of brevity, will not be described again.

It is to be appreciated that in some embodiments valve 104 may be configured such that, cab 111 may be inflated using the breath of operator 19 instead of an inflation mechanism (such as an electric air compressor). Furthermore, valve 103 may be configured such that cab 111 may be deflated by engaging a pin, button, or lever on valve 103 to deflate cab 111.

It is also to be appreciated that in some embodiments, cab 111 may include cuffs, similar to cuffs 35, 37 shown in FIGS. 1-5, where each cuff is disposed on posts 163 and 165 of cab 111. The cuffs may be used to stabilize cab 111 in a similar manner to that described above in reference to cab 11.

It is to be appreciated that the various features shown and described are interchangeable, that is, a feature shown in one embodiment may be incorporated into another embodiment.

While the disclosure has been shown and described with reference to certain preferred embodiments thereof, it will be understood by those skilled in the art that various changes in form and detail may be made therein without departing from the spirit and scope of the disclosure as defined by the appended claims.

Furthermore, although the foregoing text sets forth a detailed description of numerous embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

What is claimed is:

1. A protective apparatus for protecting an operator of a walk-behind device from environmental elements comprising:

an inflatable frame structure defining an interior volume, the inflatable frame structure including a plurality of inflatable tubes;

a sleeve arrangement configured to receive the inflatable frame structure such that the inflatable frame structure is contained within the sleeve arrangement, wherein within the sleeve arrangement, at least one end of each of the plurality of tubes is removably coupled to at least one other tube via a coupling member such that any one of the plurality of inflatable tubes is removeable from the sleeve arrangement, the sleeve arrangement made of an inelastic material and configured in substantially the same shape as the frame structure such that when the inflatable frame structure is inflated, the shape of the inflatable frame structure is maintained;

a flexible, transparent curtain configured as a single sheet of material and being separate from the inflatable frame structure, the curtain including a second opening, the curtain configured to be disposed over the inflatable frame structure such that the first opening and the second opening align to enable the operator to enter the interior volume of the inflatable frame structure;

at least one hook and loop fastener including a hook portion and a loop portion, wherein one of the hook portion or the loop portion is disposed on an interior surface of the curtain and the other of the hook portion or loop portion is disposed on the sleeve arrangement such that when the curtain is disposed over the inflatable frame structure, the hook portion is coupled to the loop portion to secure the curtain to the inflatable frame structure; and at least one coupling device that couples the inflatable frame structure to the walk-behind device such that while operating the walk-behind device, the operator is at least partially disposed in the interior volume of the inflatable frame structure.

2. The apparatus of claim 1, further comprising an inflation mechanism coupled to the inflatable frame structure to inflate the frame structure.

3. The apparatus of claim 2, wherein the inflation mechanism is a foot pump.

4. The apparatus of claim 1, further comprising at least one cuff member coupled to the interior volume of the inflatable frame structure, the at least one cuff member configured to receive an arm of an operator of the walk-behind device.

5. The apparatus of claim 4, wherein the at least one cuff member is inflatable.

6. The apparatus of claim 1, wherein the inflatable frame structure further comprises a plurality of inflatable tubes coupled to each other.

7. The apparatus of claim 6, further comprising at least one first valve disposed on at least a first inflatable tube of the plurality of inflatable tubes, the at least one first valve configured to be coupled to an inflation mechanism for inflating the inflatable frame structure.

8. The apparatus of claim 7, further comprising at least one second valve disposed on at least a second inflatable tube of the plurality of inflatable tubes, the at least one second valve configured to be coupled to a deflation mechanism for deflating the inflatable frame structure.

9. The apparatus of claim 1, further comprising a storage device configured to house the inflatable structure when the inflatable structure is in a deflated state, wherein the storage device includes a coupling mechanism to couple the storage device to the walk-behind device whether the inflatable structure is in an inflated state or a deflated state.

10. An apparatus for protecting an operator of a mechanical device from environmental elements comprising:
an inflatable frame structure defining an interior volume;
a plurality of flexible, transparent windows supported by the inflatable frame structure;
at least one coupling device that couples the inflatable frame structure to a mechanical device such that an operator is at least partially disposed in the interior volume of the inflatable frame structure when operating the mechanical device; and
at least one cuff member coupled to the interior volume of the inflatable frame structure, the at least one cuff member configured to receive an arm of an operator of the mechanical device.

11. The apparatus of claim 10, further comprising an inflation mechanism configured to inflate the inflatable frame structure.

12. The apparatus of claim 11, further comprising a storage device configured to house the inflatable frame structure when the inflatable frame structure is in a deflated state.

13. The apparatus of claim 11, wherein the inflation mechanism is a foot pump.

14. The apparatus of claim 10, wherein the cuff member is inflatable.

15. The apparatus of claim 10, wherein the plurality of flexible, transparent windows is a single sheet of material disposed over the inflatable frame structure.

16. The apparatus of claim 15, wherein the inflatable frame structure includes at least one first valve configured to be coupled to an inflation mechanism for inflating the inflatable frame structure.

17. The apparatus of claim 16, wherein the inflatable frame structure includes at least one second valve configured to be coupled to a deflation mechanism for deflating the inflatable frame structure.

18. A protective enclosure for protecting an operator of a walk-behind device from environmental elements comprising:
an inflatable frame structure defining an interior volume, the inflatable frame structure includes a plurality of inflatable tubes;
a sleeve arrangement configured to receive each tube of the plurality of tubes such that the inflatable frame structure is contained within the sleeve arrangement, wherein within the sleeve arrangement, at least one end of the plurality of inflatable tubes is removably coupled to at least one other tube via a coupling member such that any one of the plurality of inflatable tubes is removeable from the sleeve arrangement, the sleeve arrangement configured in substantially the same shape as the frame structure such that when the inflatable frame structure is inflated, the shape of the inflatable frame structure is maintained;
a flexible, transparent curtain configured as a single sheet of material and being separate from the inflatable frame structure, the curtain configured to be disposed over the inflatable frame structure;
and
at least one coupling device that couples the inflatable frame structure to the walk-behind device such that while operating the walk-behind device the operator is at least partially disposed in the interior volume of the inflatable frame structure.

19. The protective enclosure of claim 18, wherein the at least one coupling device couples at least one inflatable tube of the inflatable frame structure to at least one handlebar of the walk-behind device.

20. The protective enclosure of claim 18, further comprising a plurality of hook and loop fasteners wherein one of each hook portion or each loop portion is disposed on the interior surface of the curtain and the other of each hook portion or each loop portion is disposed on the sleeve arrangement such that when the curtain is disposed over the inflatable frame structure, each hook portion is coupled to each loop portion to secure the curtain to the inflatable frame structure.

21. The protective enclosure of claim 20, further comprising at least one first valve disposed on at least a first inflatable tube of the plurality of inflatable tubes, the at least one first valve configured to be coupled to an inflation mechanism for inflating the inflatable frame structure.

22. The protective enclosure of claim 21, further comprising at least one second valve disposed on at least a second inflatable tube of the plurality of inflatable tubes, the at least one second valve configured to be coupled to a deflation mechanism for deflating the inflatable frame structure.

* * * * *